(12) United States Patent
Maeda

(10) Patent No.: US 6,597,895 B1
(45) Date of Patent: Jul. 22, 2003

(54) RADIO TERMINAL AND METHOD FOR CONTROLLING THE SAME

(75) Inventor: Koji Maeda, Tokyo (JP)

(73) Assignee: NEC Corporation (JP)

( * ) Notice: Subject to any disclaimer, the term of this patent is extended or adjusted under 35 U.S.C. 154(b) by 101 days.

(21) Appl. No.: 09/590,228

(22) Filed: Jun. 8, 2000

(30) Foreign Application Priority Data

Jun. 8, 1999 (JP) .......................................... 11-160990

(51) Int. Cl.$^7$ ................................................. H04B 1/40
(52) U.S. Cl. .......................... 455/88; 455/420; 455/456
(58) Field of Search ........................... 455/88, 90, 418, 455/419, 420, 456, 550, 575, 522

(56) References Cited

U.S. PATENT DOCUMENTS

| | | | | |
|---|---|---|---|---|
| 4,845,772 A | * | 7/1989 | Metroka et al. | 455/90 |
| 5,442,805 A | * | 8/1995 | Sagers et al. | 455/456 |
| 5,991,614 A | * | 11/1999 | Oura | 455/88 |
| 6,085,096 A | * | 7/2000 | Nakamura | 455/456 |
| 6,122,486 A | * | 9/2000 | Tanaka et al. | 455/88 |
| 6,246,891 B1 | * | 6/2001 | Isberg et al. | 455/90 |

FOREIGN PATENT DOCUMENTS

| | | |
|---|---|---|
| EP | 0891110 | 1/1999 |
| EP | 1035747 | 9/2000 |
| EP | 1041848 | 10/2000 |
| GB | 2334859 | 9/1999 |
| GB | 2343335 | 5/2000 |
| GB | 2344971 | 6/2000 |
| JP | 9-275588 | 10/1997 |
| JP | 10-135891 | 5/1998 |
| JP | 10-243454 | 9/1998 |
| JP | 11-4478 | 1/1999 |
| WO | 98/25433 | 6/1998 |

OTHER PUBLICATIONS

U.K. Search Report issued Dec. 21, 2000 in a related application (in English).
Japanese Official Action dated Jan. 29, 2002 (with English translation of the relevant portion).

* cited by examiner

Primary Examiner—Quochien Vuong
(74) Attorney, Agent, or Firm—Dickstein, Shapiro, Morin & Oshinsky, LLP.

(57) ABSTRACT

Disclosed is a radio terminal that has: a command receiving circuit for receiving an operation mode designation command to designate an operation mode from an external command transmitter; a control section for changing the operation mode according to the operation mode designation command received by the command receiving circuit; and a counter that starts counting a predetermined time simultaneously when the operation mode is changed. The control section releases the operation mode changed according to the operation mode designation command when the counter finishes the count of the predetermined time.

23 Claims, 3 Drawing Sheets

RADIO TERMINAL AND METHOD FOR CONTROLLING THE SAME

FIELD OF THE INVENTION

This invention relates to a radio terminal used in e.g., cellular phone system and personal handyphone system, and more particularly to, a radio terminal whose function can be changed by external signal, and also relates to a method for controlling such a radio terminal.

BACKGROUND OF THE INVENTION

Japanese patent application laid-open No. 10-243454 (1993) discloses a system that a radio terminal control device is disposed at the entrance or exit of a building, the transmit function or receive notifying function of a radio terminal is changed by function control signal transmitted from the radio terminal control device, so that the transmit function is stopped to prevent the radio terminal from generating radio wave in the building and/or the receive notifying function to sound receive tone is stopped to suppress the noisy sound.

However, in the prior art, where the change of function and the release of the change of function are conducted by function control signal transmitted from the radio terminal control device, to cope with a case that the function of radio terminal is left changed, it is necessary to provide a system for releasing the function changed by function control signal by the key operation of the radio terminal. Therefore, there is a problem that, if the user of radio terminal releases the function changed by function control signal intentionally or unintentionally, then the function of radio terminal that should be stopped is recovered thereby causing undesirable radio wave or noisy sound.

SUMMARY OF THE INVENTION

Accordingly, it is an object of the invention to provide a radio terminal and a method for controlling a radio terminal that can prevent the operator from releasing the operation mode changed by external restriction command/signal intentionally or unintentionally, in order to secure the restriction of operation mode.

According to the invention, a radio terminal capable of switching a plurality of operation modes by the operation of input means, comprises:

a command receiving means for receiving an operation mode designation command to designate an operation mode;

an operation mode changing means for changing the operation mode according to the operation mode designation command received by the command receiving means; and a counter that starts counting a predetermined time simultaneously when the operation mode is changed by the operation mode changing means;

wherein the operation mode changing means releases the operation mode changed according to the operation mode designation command when the counter finishes the count of the predetermined time.

According to another aspect of the invention, a method for controlling a radio terminal capable of switching a plurality of operation modes by the operation of input means, comprises the steps of:

receiving an operation mode designation command to designate an operation mode;

changing the operation mode according to the operation mode designation command received;

stating the count of a predetermined time simultaneously when changing the operation mode; and releasing the operation mode changed according to the operation mode designation command when the count of the predetermined time is finished.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
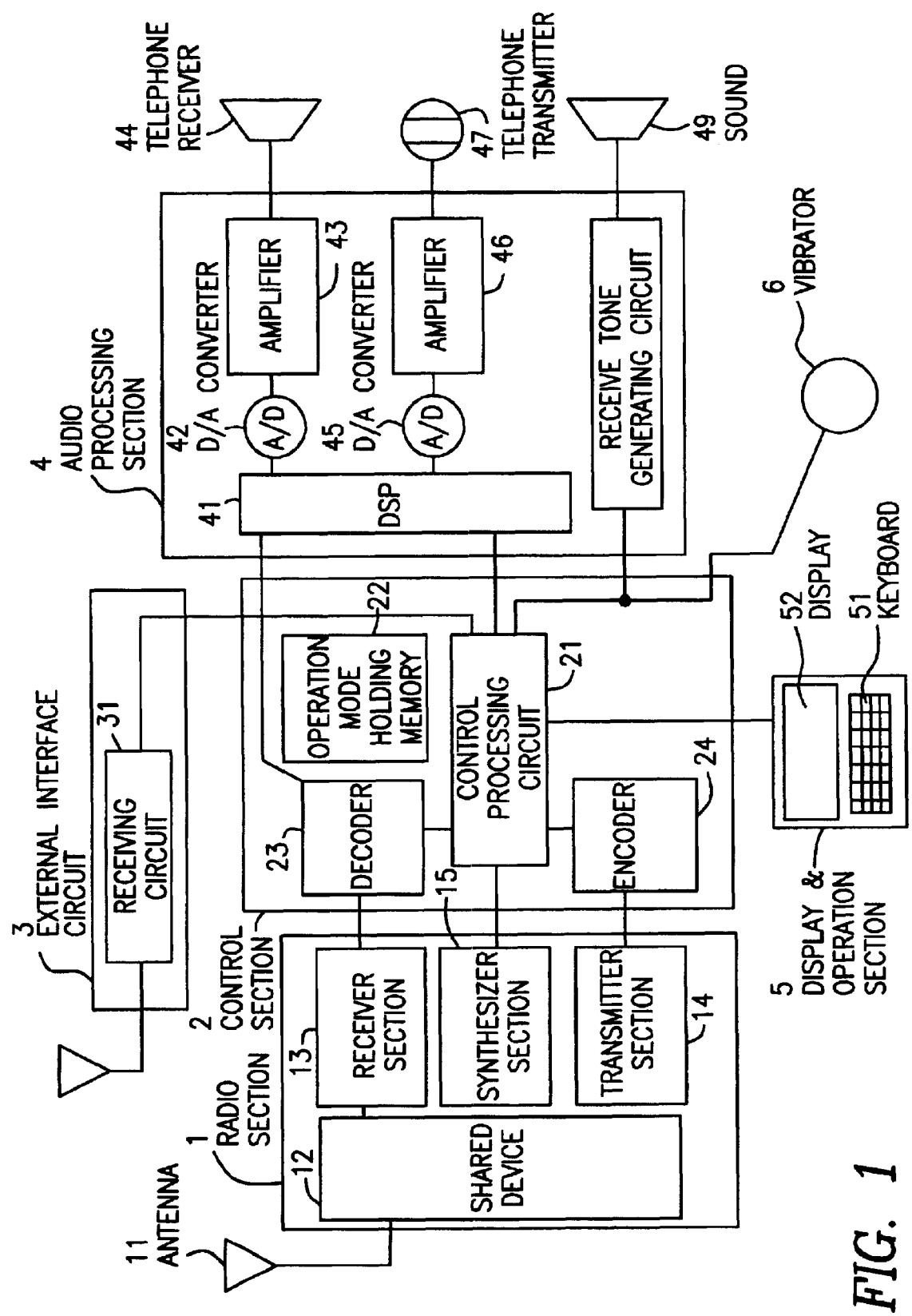
FIG. 1 is a block diagram showing the composition of a radio terminal in a first preferred embodiment according to the invention.

The preferred embodiments according to the invention will be explained below, referring to the drawings.

[First Embodiment]

FIG. 1 is a block diagram showing a radio terminal in the first preferred embodiment according to the invention.

The radio terminal in the fist embodiment comprises a radio section 1 that conducts the transmission/reception of radio signal to and from a radio base station, a control section 2 that controls the entire radio terminal, an external interface circuit section 3 that receives weak radiowave from outside, an audio processing section 4 that processes audio output and input to and from the operation, a display and operation section 5 that displays information to the operation and allows the operator to input using a keyboard, and a vibrator 6 that informs the operator of getting a call by vibration.

The radio section 1 comprises a shared device 12 connected to an antenna 11, a receiver section that receives radio signal through the antenna 11 an the shared device 12 from a radio base station and then outputs it to the control section 2, a transmitter section 14 that transmits radio signal from the control section 2 through the antenna 11 and the shared device 12 to the radio base station, and a synthesizer section 15 that identifies radio signal in the receiver section 13 and the receiver section 14.

The control section 2 comprises a control processing circuit 21 that sets the operation mode of radio terminal, an operation mode holding memory 22 that stores the operation mode of radio terminal, a decoder 23 that decodes radio signal from the receiver section 13 into receive data, and encoder 24 that generates radio signal by encoding transmit data and then outputs it to the transmitter section 14.

The control processing circuit 21, which controls the operation mode of radio terminal, makes the radio terminal change into an operation mode designated by command to be received, and makes the operation mode holding memory 22 store information of the changed operation mode as well as information of the previous operation mode (hereinafter referred to as 'before change operation mode')—before changing the operation mode. Also, the control processing circuit 21 has such a counter function that starts counting a predetermined time simultaneously when the operation mode is changed, and it releases the operation mode changed by command when the count is finished, and makes the operation mode return to the before-change operation mode. Here, the operation mode includes "receive (call-receiving) tone output mode" to notify the operator of getting a call by receive tone, "receive tone prohibiting mode" to notify the operator of getting a call by using the vibrator, "transmission prohibiting mode" to prohibit the transmission etc. Normally, the control processing circuit 21 switches among the various operation modes according to a command to be key-input from the display and operation section 5.

the operation mode holding memory 22 stores information of the operation mode changed by a command to be received, and information of the before-change operation mode.

The external interface circuit section 3 is provided with a command receiving circuit 31 that identifies a command superposed on weak radio wave, and outputs the identified command to the control processing circuit 21.

The audio processing section 4 comprises a DSP (digital signal processor) 41 to conduct the radio CODEC function, a D/A converter 42 to convert-output signal from the DSP 41 into analogue signal, an amplifier 43 to amplify analogue signal converted by the D/A converter 42, a telephone receiver 44 to output converting analogue signal amplified by the amplifier 43 into voice and sound, a telephone transmitter 47 to convert voice and sound into analogue signal, an amplifier 46 to amplify analogue signal converted by the telephone transmitter 47, an A/D converter 45 to convert analogue signal amplified by the amplifier 46 into digital signal and then output it to the DSP 41, a receive tone generating circuit 48 to generate receive tone signal in response to call-reception detection signal from the control processing circuit 21 when getting a call from the radio base station, and a sounder 49 to output converting receive tone signal from the receive tone generating circuit 48 into receive tone.

The display and operation section 5 comprises a keyboard 51 used to input a command/data, and a display 52 to display various information.

The operation of the radio terminal in the embodiment of the invention will be explained below, referring to FIGS. 2 and 3.

Figure 2:
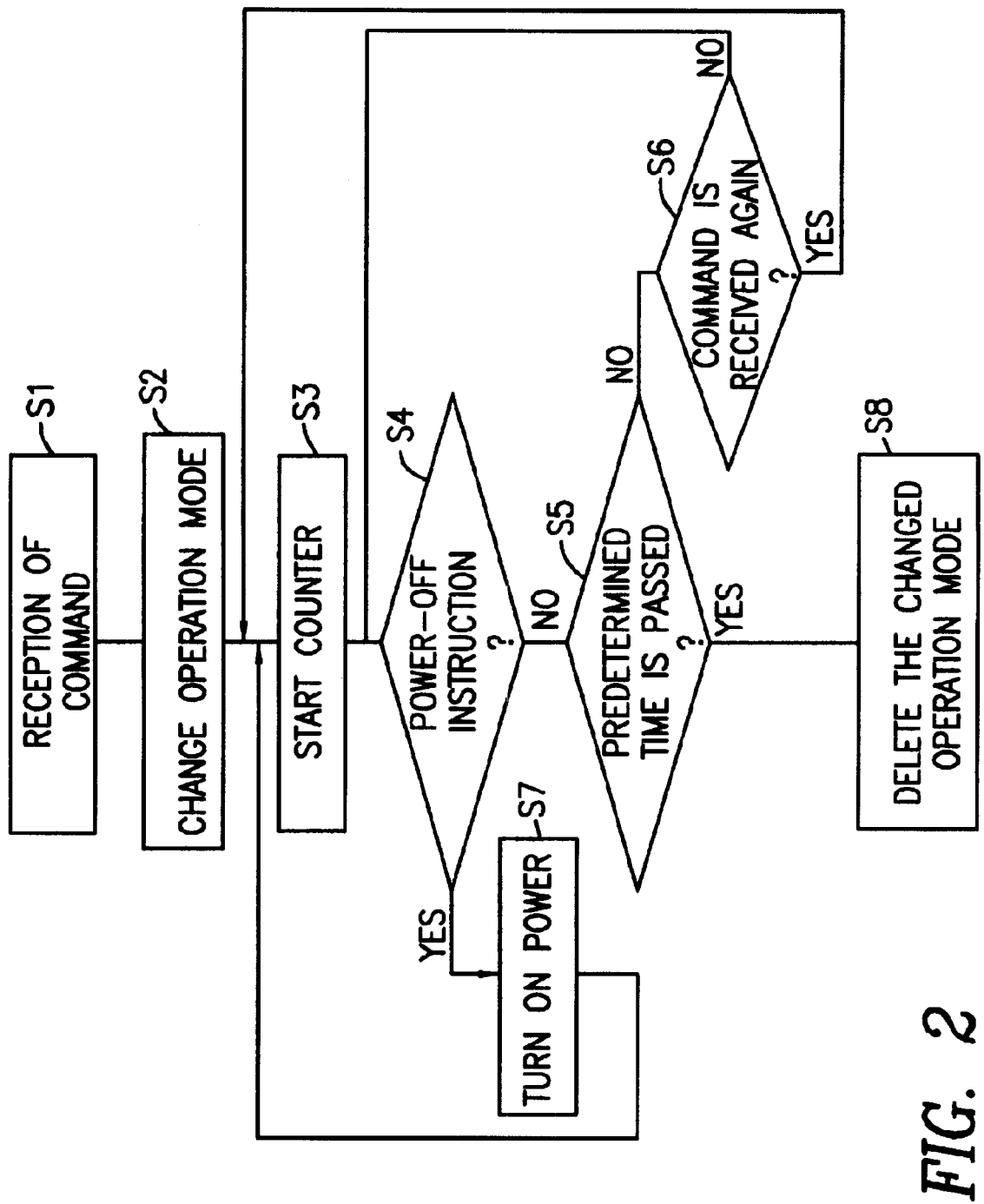
FIG. 2 is a flow chart showing the operation of the radio terminal in the first embodiment.
Figure 3:
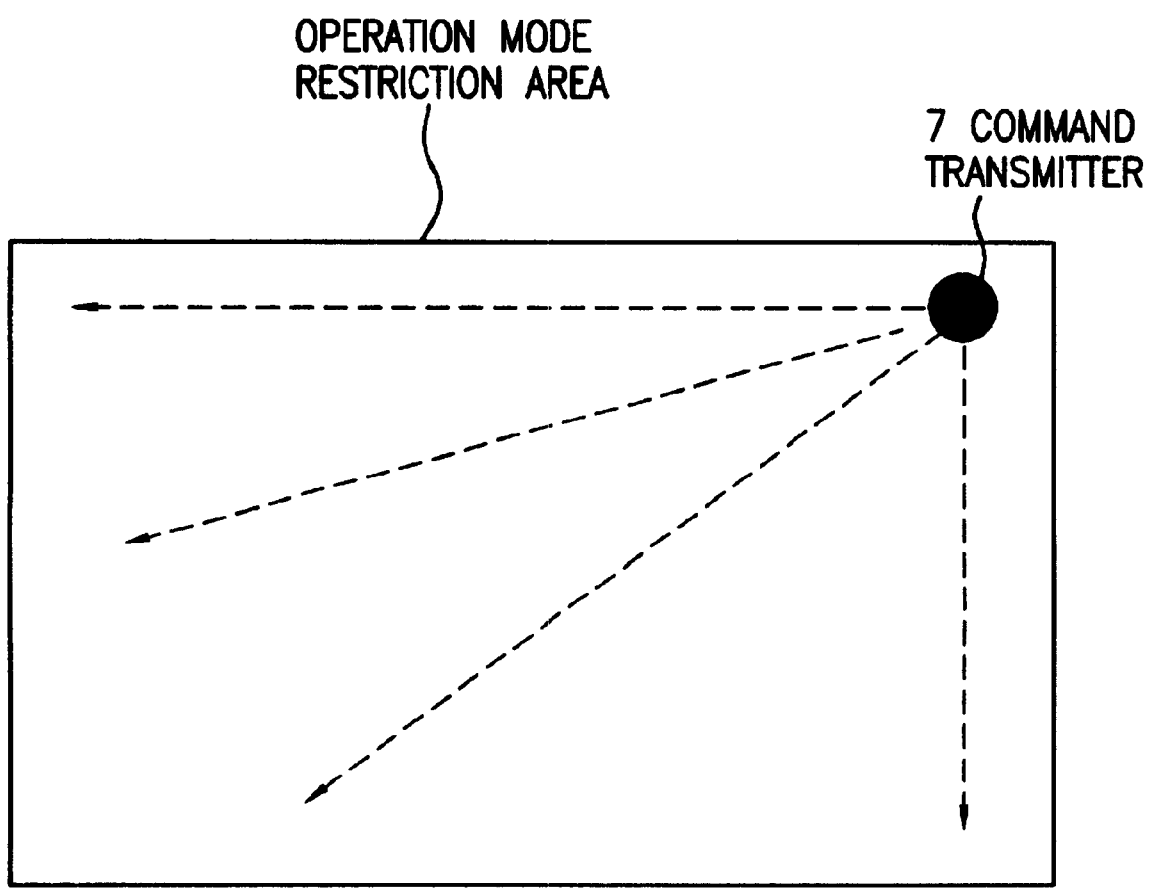
FIG. 3 is an illustration showing an example of placement of a command transmitter in an operation mode restriction area according to the invention.

FIG. 2 is a flow chart showing the operation of the radio terminal in the embodiment, and FIG. 3 is an illustration showing an example of placement of command transmitter in operation mode restriction area according to the invention.

At first, as shown in FIG. 3, a command transmitter 7 is placed in an area intended to restrict the operation mode of radio terminal (hereinafter referred to as operation mode restriction area), such as a theater, a hospital and a train. The command transmitter 7 sends weak radio wave to cover the entire operation mode restriction area. On the weak radio wave sent from the command transmitter 7, a command for restricting the operation mode of radio terminal is superposed.

When the radio terminal enters the operation mode restriction area, the command receiving circuit 31 receives the command superposed on weak radio wave being set from the command transmitter 7, and then outputs the received command to the control processing circuit 21 (step S1).

Then, the control processing circuit 21 changes the operation mode of radio terminal into an operation mode designated by the command, making the operation mode holding memory 22 store information of the changed operation mode as well as information of the before-change operation mode (step S2). Also, the control processing circuit 21, which has the counter function, starts counting a predetermined time simultaneously when the operation mode is changed (step S3). During this time, the radio terminal comes into a restricted operation mode. The restriction of operation mode includes prohibition of output of receive tone, prohibition of output in transmission and reception etc. Also, the control processing circuit 21 operates not to accept any key-input command to instruct the release or change of the changed operation mode from the keyboard 51.

Under the condition that the operation mode is restricted, i.e., the operation mode is changed, until the count of the predetermined time being started simultaneously when the operation mode is changed is finished, the control processing circuit 21 always monitors whether the command is received again from the command transmitter 7 or not (step S6). When it receives the command again, returning to step S3, the count of the predetermined time is started from the beginning. Namely, by sending out the command from the command transmitter 7 intermittently at intervals of a time within the predetermined time set to the radio terminal, the operation mode restricting condition of radio terminal can be kept continuously in the area.

Furthermore, under the condition that the operation mode is restricted, i.e., the operation mode is changed, until the count of the predetermined time being started simultaneously when the operation mode is changed is finished, the control processing circuit 21 always monitors whether an instruction to turn off the power supply is input from the keyboard 51 of radio terminal or not (step S4). When the instruction to turn off the power supply of radio terminal is input, the power supply is turned off while keeping information of the changed operation mode and information of the before-change operation mode. When an instruction to turn on the power supply of radio terminal is input from the keyboard 51 of radio terminal, referring to the contents of the operation mode holding memory 22, the power supply of radio terminal is turned on with the changed operation mode (step S7). Then, returning to step S3, the count of the predetermined time is started from the beginning.

When the command is not received again from the command transmitter 7 and further the instruction to turn off the power supply of radio terminal is input from the keyboard 51 of radio terminal, the control processing circuit 21 monitors the finish of the count of the predetermined time (step S5). If the count of the predetermined time is finished, then deleting information of the changed operation mode stored in the operation mode holding memory 22, referring to information of the before-change operation mode stored in the operation mode holding memory 22, thereby returning to the before-change operation mode (step S8).

As described above, in the first embodiment of the invention, the operation mode changed by signal from outside is released automatically. Namely, it is not necessary to employ any system to release the changed operation mode by a key-input command from the radio terminal. Therefore, the radio terminal in this embodiment can prevent the operator from releasing the command-changed operation mode intentionally or unintentionally. Thereby, it can enjoy an effect that the restriction of operation mode can be conducted securely.

[Second Embodiment]

The second preferred embodiment according to the invention will be explained below.

The second embodiment is different from the first embodiment in that, when the operation mode restriction command toward the radio terminal from the command transmitter 7 is a command to designate a low transmit power mode as the operation mode of radio terminal, the radio base station is notified of having changed the operation mode into the low transmit power mode, and telephone communications are secured through low transmit power by the control of radio base station. The other composition is similar to that in the first embodiment.

The command receiving circuit 31 of radio terminal receives the low transmit power designating command superposed on weak radio wave from the command transmitter 7, and then outputs the received low transmit-power designating command to the control processing circuit 21.

Then, the control processing circuit 31 changes the operation mode into the low transmit power mode, and sends signal to inform that the operation mode has been changed into the low transmit power mode by the receiving of the low transmit power designating command, to the radio base station through the encoder 24, the transmitter section 14 and the shared device 12. Receiving this signal, the radio base station controls the radio terminal to reduce the transmit power of radio terminal as much as possible within the range capable of transmitting radio signal sufficiently.

As described above, the second embodiment of the invention can yield an effect that the telephone communications are secured, even in an area such as a hospital subject to the influence of radio wave, while preventing medical instruments in the hospital from incurring a malfunction by reducing radio wave power generated from the radio terminal.

In the above embodiments, the command is received through the external interface circuit section 3 which is separated from the radio section 1 to communicate radio signal with the radio base station. However, it is apparent that the command may be received through the radio section 1, instead.

Also, though in the above embodiments the operation mode restriction command toward the radio terminal is sent superposed on weak radio wave from the command transmitter 7, it is apparent that it is not necessary to superpose the command on weak radio wave in an area not subject to the influence of radio wave.

Further, though in the above embodiments the operation mode restriction command toward the radio terminal is sent superposed on weak radio wave from the command transmitter 7, the operation mode restriction command may be transmitted from the radio base station, for example, when the operation mode restriction area is set to be wide.

Also, though in the above embodiments the changed operation mode is released when the count of the predetermined time is finished, the count time may be designated by the operation mode restriction command toward the radio terminal. In this case, information that designates a count time, i.e. a count time set command, is added to the operation mode restriction command toward the radio terminal, the control processing circuit 21 sets the count time according to the count time set command, and the changed operation mode is released when the count of the count time set is finished.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A radio terminal capable of switching between a plurality of operation modes, the radio terminal comprising:

a receiver for receiving an operation mode designation command for designating one of said plurality of operation modes;

a controller for changing the operation mode of said radio terminal from a first operation mode to a second operation mode according to said operation mode designation command received by said receiver;

a counter that starts counting a disable time period simultaneously when the operation mode is changed by said controller from said first operation mode to said second operation mode;

wherein said controller returns the operation mode to said first operation mode from said second operation mode when said counter finishes the count of said disable time period and no new operation mode designation command is received;

a memory for storing information indicating said first operation mode;

wherein said controller sets the operation mode based on said stored information of the first operation mode when said counter finishes the count of said disable time period and no new operation mode designation command is received.

2. A radio terminal, according to claim 1, wherein:

when said controller receives the operation mode designation command again during the count of the disable time period, said counter restarts counting said disable time period from the beginning.

3. A radio terminal, according to claim 1, wherein:

when a power supply is instructed to turn off through the operation of an input, the power supply is turned off while keeping said information indicating the first mode stored in said memory.

4. A radio terminal, according to claim 3, wherein:

said controller sets the operation mode based on the information of the first mode stored in said memory when turning on the power supply, and said counter starts counting said disable time period.

5. A radio terminal, according to claim 1, wherein:

said receiver receives a count time setting command:
said counter starts counting a time set by said count time setting command received by said receiver simultaneously when the operation mode is changed by said controller; and
said controller releases the second operation mode when said counter finishes the count of said disable time period set by said count time setting command and no new operation mode designation command is received.

6. A radio terminal, according to claim 1 further comprising:

a transmitter for outputting a reception notification signal for notifying a radio base station of the reception of the operation mode designation command to the radio base station;

wherein when the operation mode designation command received by said receiver designates a low transmit power mode, said transmitter outputs the reception notification signal for notifying the radio base station of having changing the operation mode into the low transmit power command to the radio base station.

7. A radio terminal, according to claim 1, wherein said operation modes comprise: receive tone output mode and receive tone prohibiting mode.

8. A radio terminal capable of switching a plurality of operation modes by the operation of input means according to claim 1, the radio terminal further comprising:

a storage medium including a program, wherein said program is capable of:
- receiving an operation mode designation command to designate one of a plurality of operation modes;
- storing information of a first operation mode that has been set before changing the operation mode;
- changing the operation mode according to the operation mode designation command received from said first operation mode to a second operation mode;
- starting the count of a disable time period simultaneously when changing the operation mode from said first operation mode to said second operation mode; and
- releasing the operation mode changed according to the operation mode designation command from said second operation mode to said first operation mode when the count of the disable time period is finished and no new mode designation command is received.

9. A radio terminal capable of switching between a plurality of operation modes by the operation of input means according to claim 8, the storage medium including a program further comprising:
- storing information of the second operation mode changed according to the operation mode designation command;
- when the power supply is instructed to turn off through the operation of an input, the power supply is turned off while keeping said information of the second operation mode stored.

10. A radio terminal capable of switching between a plurality of operation modes by the operation of input means according to claim 9 further comprising a storage medium including a program, said program capable of:
- setting the operation mode based on information of the second operation mode stored when turning on the power supply; and
- starting the count of said disable time period.

11. A radio terminal capable of switching between a plurality of operation modes by the operation of input means according to claim 8 comprising a storage medium including a program, said program further capable of:
- receiving further a count time setting command;
- starting the count of a time set by said received count time setting command simultaneously when the operation mode is changed; and
- releasing the operation mode changed according to said operation mode designation command when the count of said time set by said count time setting command is finished and no new mode designation command is received.

12. A radio terminal capable of switching between a plurality of operation modes by the operation of input means according to claim 8 comprising a storage medium including a program, said program further capable of:
- outputting a reception notification signal for notifying a radio base station of the reception of the operation mode designation command when the operation mode designation command received designates a low transmit power mode; and
- outputting the reception notification signal for notifying the radio base station of having changing the operation mode into the low transmit power mode.

13. A method for controlling a radio terminal capable of switching between a plurality of operation modes by a controller, the method comprising:
- receiving an operation mode designation command to designate one of a plurality of operation modes;
- storing information of a first operation mode that has been set before changing the operation mode;
- changing the operation mode according to the operation mode designation command received from the first operation mode to a second operation mode;
- starting the count of a disable time period simultaneously when changing the operation mode from said first operation mode to said second operation mode; and
- releasing the operation mode changed from said second operation mode to said first operation mode according to the operation mode designation command when the count of the disable time period is finished and no new operation mode designation command is received;
- wherein the operation mode is set based on information of the stored first operation mode when the count of the disable time period is finished and no new operation mode designation command is received.

14. A radio terminal control method, according to claim 13, wherein:
- when the operation mode designation command is received again during the count of the disable time period, the count of said disable time period is restarted from the beginning.

15. A radio terminal control method, according to claim 13, further comprising the step of:
- storing information of the operation mode changed according to the operation mode designation command; and
- when a power supply is instructed to turn off through the operation of an input means, the power supply is turned off while keeping said information of the first operation mode stored.

16. A radio terminal control method, according to claim 13, wherein:
- setting the operation mode based on information of the first operation mode stored when turning on the power supply; and
- starting the count of said disable time period.

17. A radio terminal control method, according to claim 13, further comprising the steps of:
- receiving a count time setting command;
- starting the count of said disable time period set by said received count time setting command simultaneously when the operation mode is changed; and
- releasing the operation mode changed according to said operation mode designation command when the count of said time set by said count time setting command is finished and no new operation mode designation command is received.

18. A radio terminal control method, according to claim 13, further comprising the steps of:
- outputting a reception notification signal for notifying a radio base station of the reception of the operation mode designation command; and
- when the operation mode designation command received designates a low transmit power mode, outputting the reception notification signal for notifying the radio base station of having changing the operation mode into the low transmit power mode.

19. A radio terminal control method, according to claim 13, wherein said operation modes comprise: receive tone output mode and receive tone prohibiting mode.

20. A method for controlling the operation of a radio terminal operable in at least three modes of operation, said method comprising:

receiving a disable signal while the radio terminal is operating in one of the modes;

storing information identifying the operation mode of the radio terminal when the disable signal is received;

switching the radio terminal into a different operation mode in response to the receipt of the disable signal; and returning the radio terminal into the operating mode identified by the stored information after the expiration of a disable time period during which a second disable signal is not received.

21. A method for controlling the operation of a radio terminal according to claim 20, further comprising:

turning off the radio terminal before returning the radio terminal to the mode identified by the stored information;

turning on the radio terminal; and returning the radio terminal to the operation mode identified by the stored information in response to the radio terminal being turned on.

22. A method for controlling the operation of a radio terminal according to claim 20, further comprising:

setting the length of the disable time period as a function of a disable time period signal received by the radio terminal.

23. A method for controlling he operation of a radio terminal according to claim 22, further comprising:

receiving the disable time period signal with the disable signal.

* * * * *